(12) United States Patent
Heisler et al.

(10) Patent No.: US 6,897,280 B2
(45) Date of Patent: May 24, 2005

(54) CONTINUOUS MANUFACTURE OF SILICONE COPOLYMERS VIA MULTI-STAGE BLADE-MIXED PLUG FLOW TUBULAR REACTOR

(75) Inventors: Ladislau Heisler, Marietta, OH (US); David D. Farris, Marietta, OH (US); David B. Davis, St. Marys, WV (US); Paul E. Austin, Williamstown, WV (US)

(73) Assignee: General Electric Company, Pittsfield, MA (US)

( * ) Notice: Subject to any disclaimer, the term of this patent is extended or adjusted under 35 U.S.C. 154(b) by 142 days.

(21) Appl. No.: 10/253,263

(22) Filed: Sep. 23, 2002

(65) Prior Publication Data

US 2004/0059059 A1 Mar. 25, 2004

(51) Int. Cl.$^7$ .............................................. C08G 77/08
(52) U.S. Cl. ........................... 528/15; 528/31; 556/479; 526/65
(58) Field of Search ...................... 528/15, 31; 556/479; 526/65

(56) References Cited

U.S. PATENT DOCUMENTS

| | | | |
|---|---|---|---|
| 2,834,748 A | 5/1958 | Bailey et al. ................. | 260/42 |
| 3,980,688 A | 9/1976 | Litteral et al. ............ | 260/448.8 |
| 4,025,456 A | 5/1977 | Litteral et al. .............. | 252/351 |

(Continued)

FOREIGN PATENT DOCUMENTS

| | | |
|---|---|---|
| DE | 196-32157 A1 | 2/1998 |
| EP | 1013701 A2 | 6/2000 |
| WO | PCT/US94/06804 | 6/1994 |

OTHER PUBLICATIONS

Stevens, "Organosilicone Surfactants as Adjuvants for Agrochemicals," Pesticide Science, 1993, 38, pp. 103–122.

Fink et al., "Development of New Additives to Improve Scratch Resistance and Impart Slip to Solvent–Based Coatings Systems," Journal of Coating Technology, 62, No. 791, Dec. 1990, pp. 47–56.

Bailey et al., "A Reaction Sequence Model for Flexible Urethane Foam," Urethane Chemistry and Applications, Series No. 172, A.C.S., Washington, D.C., (1981), pp. 127–147.

Drose et al., "Process and Apparatus for Continuous Hydro–silylation," CA Selects Plus: Organosilicon Chemistry, Issue 16, 2000, p. 28.

J. Cellular Plastics, Nov./Dec. 1981, pp. 333–334.

*Primary Examiner*—Margaret G. Moore

(57) ABSTRACT

A process is disclosed for producing silicone copolymers, wherein the process comprises the steps of:
  (a) providing at least one multi-stage blade-mixed plug flow reactor having an entry and an exit;
  (b) continuously feeding (i) hydrogen siloxane, (ii) olefinically substituted polyether or olefin capable of reacting with said hydrogen siloxane, and (iii) catalyst for the reaction to the entry of the multi-stage blade-mixed plug flow reactor, and
  (c) continuously withdrawing from the exit of the multi-stage blade-mixed plug flow reactor a stream that comprises silicone copolymer and is substantially free of unreacted hydrogen siloxane, provided that said hydrogen siloxane and said polyether or olefin have a residence time at reaction temperature in the multi-stage blade-mixed plug flow reactor sufficient to effect substantially complete hydrosilation.

11 Claims, 1 Drawing Sheet

U.S. PATENT DOCUMENTS

| | | | |
|---|---|---|---|
| 4,782,095 A | | 11/1988 | Gum .......................... 514/937 |
| 4,801,447 A | | 1/1989 | Gum .......................... 424/68 |
| 4,847,398 A | * | 7/1989 | Mehta et al. ................ 556/445 |
| 4,857,583 A | | 8/1989 | Austin et al. ............... 524/761 |
| 5,001,248 A | | 3/1991 | Grabowski .................. 556/456 |
| 5,153,293 A | | 10/1992 | Hales et al. .................. 528/15 |
| 5,159,096 A | * | 10/1992 | Austin et al. ............... 556/445 |
| 5,191,103 A | | 3/1993 | Mehta et al. ............... 556/479 |
| 5,559,264 A | | 9/1996 | Bowman et al. ............ 556/479 |
| 5,986,022 A | * | 11/1999 | Austin et al. ................. 526/65 |
| 5,986,122 A | | 11/1999 | Lewis et al. ................. 556/445 |
| 6,015,920 A | * | 1/2000 | Schilling et al. ............ 556/479 |
| 6,291,622 B1 | * | 9/2001 | Drose et al. .................. 528/31 |
| 6,410,772 B2 | * | 6/2002 | Okuyama et al. ........... 556/479 |
| 6,448,361 B1 | * | 9/2002 | Austin et al. ................. 528/25 |
| 6,593,436 B2 | * | 7/2003 | Austin et al. ............... 525/479 |

* cited by examiner

CONTINUOUS MANUFACTURE OF SILICONE COPOLYMERS VIA MULTI-STAGE BLADE-MIXED PLUG FLOW TUBULAR REACTOR

BACKGROUND OF THE INVENTION

1. Field of the Invention

The present invention relates to an improved process for the manufacture of siloxane-oxyalkylene copolymers. More particularly, the present invention relates to a process for the continuous production of silicone-containing copolymers with polyalkoxy substituent chains, and to the products produced by the process

2. Description of Related Art

Silicone-containing copolymers were identified as stabilizers for polyurethane foam as early as 1958 by Bailey in U.S. Pat. No 2,834,748, and have been the subject of numerous subsequent patents. They also serve in many other applications, most frequently as surface-tension lowering agents in agricultural adjuvants (see Stevens, P. G, Pesticide Science, 1993, 38:103–122), but also as additives for coatings applications (see Fink, F, Journal of Coating Technology, 62, No. 791, December 1990), antifoams (International published patent application PCT/US94/06804), and emulsifiers (U.S. Pat. Nos. 4,782,095 and 4,801,447). The total volume of such copolymers manufactured worldwide each year has been estimated to be in excess of 100 million pounds.

The reaction of hydrosilatable olefins, such as allyl-terminated polyalkyleneoxides or 1-octene, with hydrosiloxanes such as poly(dimethyl)(methylhydrogen) siloxanes in the presence of an appropriate catalyst is known. Likewise, the reaction of hydrosilatable olefins, such as allyl chloride or 1-octene, with hydridosilanes such as trimethoxysilane, in the presence of an appropriate catalyst, is known.

U.S. Pat. No. 5,559,264 discloses a method for preparing chloroalkylalkoxysilanes by reacting an allylic chloride with a small molar excess of a hydromethoxysilane in the presence of a ruthenium catalyst and preferably in the substantial absence of an inert solvent.

U.S. Pat. No 5,986,022 discloses a continuous process for producing silicone copolymers using a series of at least one stirred-tank reactor, the last of which reactors in said series has crude product stream feeding into at least one plug flow reactor, wherein this crude product stream is sufficiently homogeneous that this stream which undergoes further reaction in the plug flow reactor does not undergo phase separation.

U.S. Pat. No. 6,015,920 discloses a process for hydrosilation reactions between olefins and hydrosilanes or hydrosiloxanes wherein a portion of the reactor output is recycled continuously to the reactor.

U.S. Pat. No. 6,291,622 discloses a continuous process for preparing organomodified polysiloxanes by the transition metal-catalyzed addition of polysiloxanes containing SiH groups onto substances containing C—C multiple bonds, in particular a process for the continuous hydrosilylation of substances containing C—C multiple bonds, which comprises introducing the reactants, in the presence or absence of a homogeneous or heterogeneous catalyst, into a loop-like, heatable and coolable reaction circuit which has a static mixing element and/or a dynamic mixing element to mix starting materials and product formed, leaving the reaction mixture circulating in the reaction circuit until a predetermined degree of conversion has been reached and subsequently transferring the reaction mixture still containing starting materials to a tube reactor to complete the reaction and taking it off via a receiver. In addition, a suitable industrial apparatus for carrying out the process is described.

U.S. Pat. No. 6,410,772 discloses a continuous method for performing a hydrosilylation reaction comprising effecting a hydrosilylation reaction between a liquid organosilicon compound (A) having in each molecule at least one silicon-bonded hydrogen atom and a liquid organosilicon compound (B) having in each molecule at least one aliphatic unsaturated bond in the presence of a platinum catalyst (C) continuously in a tubular reactor equipped with a stirring and plug-flow maintaining apparatus located within the reactor.

German Offenlegungschrift 196-32157 A1, discloses a process for the continuous production of organosilicon compounds of the 3-halopropylorganosilane type with the general structure:

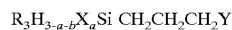

where R stands for $CH_3$, $C_2H_5$, $OCH_3$, $O\ C_2H_5$, or $OC_3H_7$;

Y stands for F, Cl, Br, or I; and where a and be each stand for one of the numbers 0, 1, 2, or 3, the sum of a+b being equal to 1, 2, or 3. The formation of by-products is suppressed by preventing the educts from reacting completely, i.e., by adjusting the conversion to about 10–80% based on the total weight of the deficit component.

U.S. Pat. No. 6,593,436 discloses a continuous process for the manufacture of silicone copolymer utilizing at least one static mixing plug flow reactor, and optionally two static mixing plug flow reactors in series or parallel. Silicone copolymers produced in accordance thereof are substantially free of unreacted hydrogen siloxane starting material and may be used without further purification. The static mixing plug flow reactor contains static mixing elements capable of creating eddies and vortices of sufficient intensity that a biphasic liquid mixture, such as hydrogen siloxane fluid and a polyether olefinic reactant, undergoes shearing of the droplets of each material so that one phase disperses into another to provide intimate contact between the two phases to allow the reaction to proceed until phase separation is no longer chemically possible.

There is interest in finding improved modes of carrying out the hydrosilation reaction. Improvements are elusive because of the variety of byproducts that typically are formed, their properties, and the need to control their formation and to remove those that do form from the desired siloxane copolymer product In addition, the hydrosilation reaction itself is sensitive to a number of conditions such that it can become necessary to balance competing effects and to accept non-optimum results.

Certain process schemes for carrying out the hydrosilation reaction, while effective, pose drawbacks. For instance, typical batchwise operation produces a crude product containing the desired hydrosilated siloxane copolymer in mixture with byproducts, reaction solvents, and one or more unreacted reactants. This crude product needs to be treated to recover the desired product in a subsequent stage, and it needs to be stored until it is passed to that stage. This storage, even temporary, poses a risk of degrading the product, as well as a risk of the crude product undergoing cross-contamination with other products. Also, storing crude product within the reaction scheme represents an accumulated inventory that raises the overall cost of the process Further, in a continuous process operation as described in U.S. Pat. No. 5,986,022, multiple stirred tank reactors are required prior to the use of a non-agitated plug flow reactor, otherwise phase separation of the reactants is likely to occur and will cause potential performance problems in the product. And although beneficial in certain applications, slightly different molecular weight distributions of copolymer products are obtained when compared to batchwise processing.

In the discussion that follows, the term "silicone-containing copolymer" is used to refer to the generic chemical entity obtained by the combination of a chemical entity containing the methyl siloxy moiety with at least one other chemical entity, such as with a polyether, with an alkyl olefin, or with a compound containing an olefinically unsaturated group and substituted with another chemical functionality; or with a combination of such entities. Thus, a terpolymer, for example, a polymeric entity containing dimethylsiloxy groups, polyether groups, and alkylmethylsiloxy groups, would be included in this definition of copolymer. Also, a dialkyl, tetramethyldisiloxane would be included in this definition, as would be an $\alpha,\omega$-[bis(polyoxyalkylene)propyl]polydimethylsiloxane.

The efficient manufacture of such copolymers is desired for two primary reasons: 1) lower cost, and 2) less waste. Although the second factor inherently influences the first, the relative significance on cost may be low; but the impact of waste on the environment, and consequently on the waste-treatment facilities that must be installed to prevent the copolymer from unintentionally reaching the environment, is large. Hence, a method or process of manufacture that is inherently more efficient is of considerable utility. If, in addition, the equipment needed for that method or process is less costly to construct, such method or process will be attractive to manufacturers.

The present invention fulfills this need by means of a continuous process. Continuous systems are much smaller than batch reactor systems and are thus less costly. But more importantly from an operating perspective, they contain much less product, and are thus much easier to clean. They thus generate less waste, if cleaning is implemented between two different products, and less material is lost from equipment "holdup", so overall efficiency is higher. From an operating perspective, they are also more "controllable", in the sense that the extent or degree of reaction is primarily determined by the reactor or equipment design, as opposed to a batch reactor system, wherein the extent or degree of reaction is primarily determined by elapsed time, which factor can be enormously influenced by a multitude of variables, such as purity of raw materials, temperature, material of construction, and others.

Chemical reactions may be conducted in a batch fashion, in a continuous fashion, or in hybrid fashion (partially batch or partially continuous). For example, in batch mode, the reactants necessary to prepare a silicone-containing copolymer of the type produced in the present invention are (1) a silicone methyl hydrogen fluid (hereinafter referred to as a hydrogen siloxane fluid); and (2) an olefinically-terminated polyether (hereinafter referred to as a polyether or an allyl-polyether) or another olefinically-terminated compound (hereinafter referred to as an olefin or an olefinic compound). The two components are mixed together, in appropriate amounts, with a noble metal catalyst added. A vigorous reaction ensues, and the olefin, by hydrosilation, becomes chemically attached to the silicone.

Because in most cases the hydrogen siloxane fluid and the polyether or olefin are immiscible, a compatibilizing agent is frequently used to facilitate reaction. This agent is often called a solvent, although it is not necessary to use it in sufficient quantity to totally dissolve both components. If the hydrogen siloxane fluid and polyether or olefin are sufficiently low in minor to trace components, the amount of "solvent" can be decreased (see U.S. Pat. Nos. 4,025,456 and 3,980,688), in some cases to zero. However, in those cases, good mixing becomes even more significant, so as to maximize the contact between the two (relatively) immiscible phases.

The reaction between the raw materials need not be conducted in a purely batch fashion. For example, if the reactivity of the hydrogen siloxane fluid is very high, the polyether or olefin may be charged to the reactor in its entirety, a fraction of the hydrogen siloxane fluid may be charged, the reaction catalyzed by adding a noble metal catalyst solution, and the remaining hydrogen siloxane fluid added subsequently and at such a rate, after the initial reaction exotherm has begun to subside, that the reaction is kept under control. This process is sometimes called semi-batch, or (incorrectly) semi-continuous. If both the hydrogen siloxane fluid and the polyether or olefin were added only in part initially, and then all components were added continuously after the reaction initiated, and added until the reactor were full, the reaction would be called (correctly) semi-continuous.

There are, in a general sense, two types of continuous reactors that are conceptually suitable for copolymer formation: continuous stirred tank reactors (known as CSTR's); and plug-flow reactors. A CSTR is simply a tank, usually vigorously agitated, into which the reactants and catalysts—all the components of a batch reaction—are fed continuously, and product is withdrawn continuously and at the same total rate as reactants are added. It is inherent, however, in this type of reactor, that not all of any of the reactants can be completely consumed uniformly. Although the system is vigorously agitated, fresh reactants, just momentarily previously introduced into the system, have a finite probability of exiting the reactor by withdrawal of the contents, along with old reactants that have spent much longer time in the tank, i.e., they have reacted, and, hence, have become crude product. A silicone-containing copolymer containing unreacted hydrogen siloxane fluid is well known in the art to be totally unsuitable for making certain polyurethane foams, for example, it affords low potency flexible/slab-stock foam and, at worst, can collapse flexible/slab-stock foam.

In the simplest version of a plug-flow reactor, all reactants are introduced into the front end of a pipe of sufficient length to ensure reaction completion. The pipe is usually maintained at the temperature of reaction, and reaction ensues along the length of the pipe. The length of the pipe is determined by the time necessary to cause the reaction to proceed to completion, i.e., at least one of the reactants has been completely consumed. The above described problem of unreacted hydrogen siloxane fluid exiting a CSTR reactor might be circumvented by the use of a plug flow reactor, were it not that without continued mixing, an immiscible hydrogen siloxane fluid and polyether will phase-separate very rapidly subsequent to initial mixing, thus causing the reaction to proceed more and more slowly. (In fact, the reaction ceases rapidly without ongoing agitation, and then fails to proceed, even upon renewed agitation, which effect is believed to be caused by gradual, irreversible deactivation of the noble metal catalyst.)

Thus, neither of the two standard continuous reactor systems alone are effective for the manufacture of silicone-polyether copolymers, or any other silicone-containing copolymer for which the reactants are immiscible, as taught in U.S. Pat. No. 5,986,022.

It might be argued that the compatibilizing agent, or "solvent", referred to earlier, might serve as a means of maintaining phase compatibility in a plug flow reactor. However, the volume of solvent needed to achieve one phase is impracticably large, and any inherent advantage of a continuous reactor system is lost by virtue of the requisite size of equipment imposed by the large volume of solvent and by the added requirement for subsequently removing any volatile or otherwise interfering solvent from the copolymer to render it useful. In the absence of "solvent", or in less than a fully compatibilizing quantity, and in a batch mode, and using standard hydrogen siloxane fluid and immiscible polyether or olefin reactants, the reaction frequently, and unpredictably, proceeds only to partial degrees of completion. The degree of completion is often sufficiently low that phase separation would, and does, occur in a non-agitated plug-flow reactor system. This phase separation is invariably accompanied by deactivation of the noble metal catalyst, either partly or completely.

SUMMARY OF THE INVENTION

The present invention relates to the reaction, known as a hydrosilation, in which a polysiloxane, which is substituted with hydrogen and with alkyl and/or alkoxy groups, is reacted with an olefin This invention is directed, in particular, to hydrosilation of silanic polysiloxanes, but also includes other species as discussed below.

Neither a CSTR, nor a non-agitated plug-flow reactor, alone, provides for the continuous manufacture of silicone-polyether copolymer suitable for use in urethane foam. However, when used in combination, the reactor system described in U.S. Pat. No. 5,986,022 has been found to be effective at driving the reaction to completion as long as the hydrosilation reaction has proceeded to the extent of affording a homogeneous reaction system prior to entering the plug flow reactor, without undergoing the phenomenon of phase separation.

It has now been discovered that silicone-containing copolymers can be manufactured in continuous fashion in a tubular reactor equipped with stirring blades in a multi-stage environment and plug-flow maintaining device. By using solely a particular type of continuous multi-stage, blade-mixed plug flow tubular reactor wherein the rotating blade of each stage is isolated with separating stationary barriers placed between blades, and by operating within certain carefully defined conditions, overall plug-flow conditions can easily be maintained, resulting in complete and uniform reaction of SiH and overcoming limitations taught in U.S. Pat. No. 6,410,772.

Additionally, it has been found that the copolymer produced in this continuous multi-stage mixing plug flow fashion can be virtually identical to batch-produced product and in certain ways is different from those products prepared via continuous CSTR processing, such as described in U.S. Pat. No. 5,986,022

Thus, in one aspect, the present invention is directed to a process for producing silicone copolymers, comprising the steps of (a) providing at least one multi-stage blade-mixed plug flow reactor having an entry and an exit;

(b) continuously feeding (i) hydrogen siloxane, (ii) olefinically substituted polyether or olefin capable of reacting with said hydrogen siloxane, and (iii) catalyst for the reaction to the entry of the multi-stage blade-mixed plug flow reactor; and (c) continuously withdrawing from the exit of the multi-stage blade-mixed plug flow reactor a stream that comprises silicone copolymer and is substantially free of unreacted hydrogen siloxane, provided that said hydrogen siloxane and said polyether or olefin have a residence time at reaction temperature in the multi-stage blade-mixed plug flow reactor sufficient to effect substantially complete hydrosilation.

In a preferred embodiment, the process of the present invention further comprises at least one finishing step, such as filtration or vacuum stripping, prior to step (c).

In another aspect, the present invention is directed to a silicone copolymer produced by a process for producing silicone copolymers, comprising the steps of (a) providing at least one multi-stage blade-mixed plug flow reactor having an entry and an exit;

(b) continuously feeding (i) hydrogen siloxane, (ii) olefinically substituted polyether or olefin capable of reacting with said hydrogen siloxane, and (iii) catalyst for the reaction to the entry of the multi-stage blade-mixed plug flow reactor; and (c) continuously withdrawing from the exit of the multi-stage blade-mixed plug flow reactor a stream that comprises silicone copolymer and is substantially free of unreacted hydrogen siloxane, provided that said hydrogen siloxane and said polyether or olefin have a residence time at reaction temperature in the multi-stage blade-mixed plug flow reactor sufficient to effect substantially complete hydrosilation

DESCRIPTION OF THE PREFERRED EMBODIMENTS

Reactants

Figure 1:
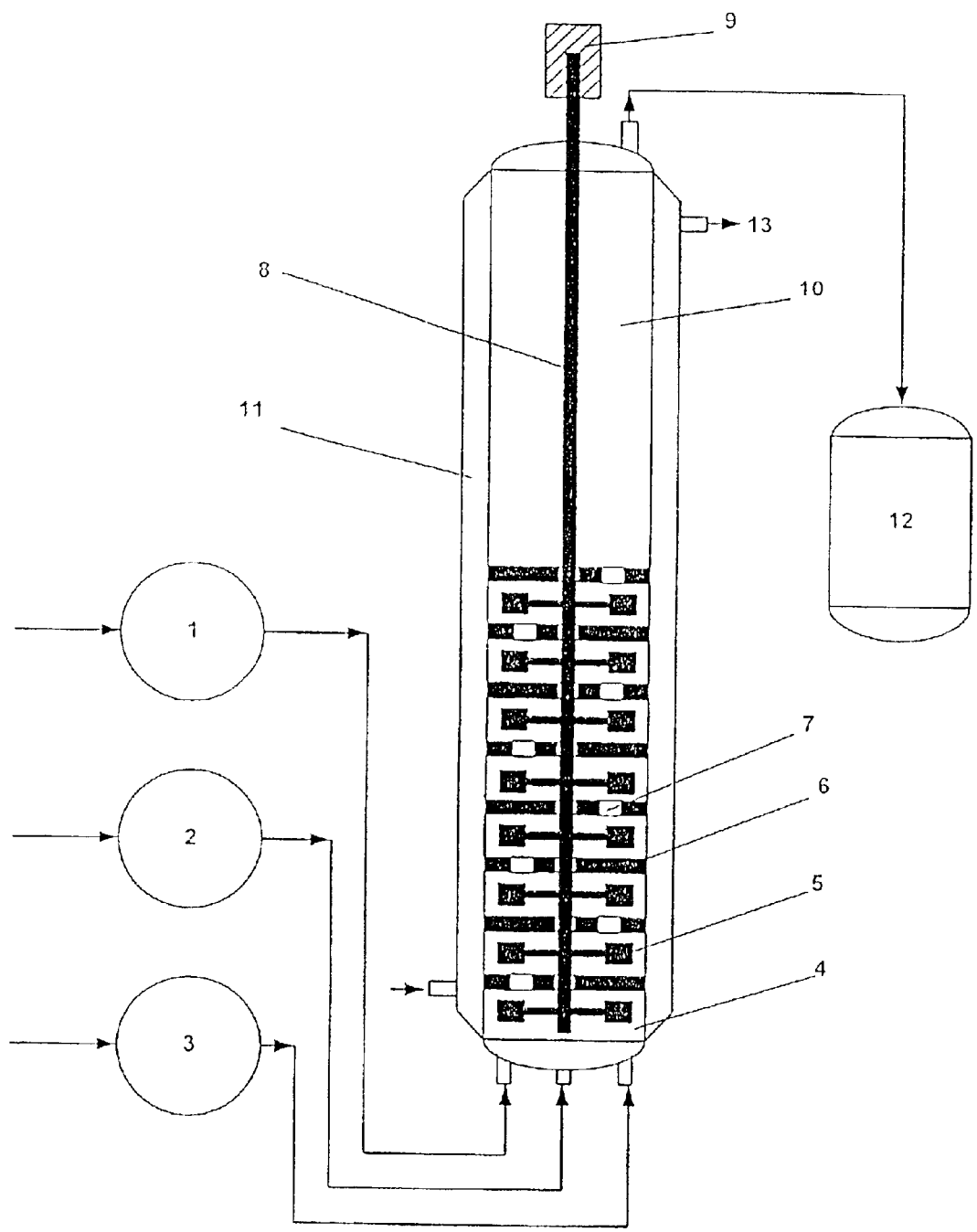
FIG. 1 is a schematic representation of a multi-stage blade-mixed plug flow reactor employed in the practice of the present invention

The present invention is applicable to the reaction, typically catalyzed, between a reactant termed herein a "hydrogen siloxane" and a polyether or olefin.

The hydrogen siloxane can be an organohydrogensiloxane comprising any combination of siloxane units selected from the group consisting of $R_3SiO_{1/2}$, $R_2HSiO_{1/2}$, $R_2SiO_{2/2}$, $RHSiO_{2/2}$, $RSiO_{3/2}$, and $HSiO_{3/2}$, provided that the hydrogen siloxane comprises sufficient R-containing siloxane units to provide an average of from 1 to 3 R radicals per silicon atom and sufficient H-containing siloxane units to provide from 0.01 to 1 silicon-bonded hydrogen atoms per silicon atom and a total of R radicals and silicon-bonded hydrogen atoms of from 1.5 to 3.0 per silicon atom.

Each R group is an independently selected hydrocarbon moiety Preferably, the hydrocarbon moieties are $C_1$ to $C_{12}$ alkyl radicals, such as methyl, ethyl, propyl, butyl, pentyl, hexyl, heptyl, octyl, nonyl, decyl, and isomers thereof; cycloaliphatic radicals comprising from 5 to 12 carbon atoms, such as cyclopentyl, cyclohexyl, and cyclooctyl, and aryl radicals, such as phenyl, optionally substituted with from 1 to 6 alkyl groups, each of from 1 to 6 carbon atoms, such as tolyl and xylyl. It is more preferred that all R groups be the same and that they be methyl.

The hydrogen siloxanes employed in the practice of the present invention are typically fluids with a hydrogen content of from about 5 cc/gm to about 334 cc/gm The viscosities of the fluids can range from less than 1 cstk (centistoke) to greater than 300 cstk, as long as appropriate pumps are used The structures of these fluids range from pure monomer, such as 1,1,2,2 tetramethyldisiloxane (M'M') to polymeric equilibrated fluid having a structure of $MD_{150}D'_{10}M$. Dimethylhydrogensiloxy end-blocked structures can also be used to prepare linear block copolymers, sometimes referred to as $(AB)_nA$ structures. There appears to be no limit to the structure of the hydrogen siloxane other than that imposed by handling (practical) aspects and the desired properties of the copolymer product The olefin reactant employed in the practice of the present invention can be any that reacts with a hydrosilane or hydrosiloxane in the desired reaction. As employed herein, the term "olefin" includes not only unsaturated hydrocarbons, but any compound that has an ethylenic or acetylenic unsaturation that can be hydrosilated, including, but not limited to, acetylene and allyl starting materials. Preferred olefins for use in the practice of the present invention include allyl chloride and methallyl chloride. Other useful olefin reactants include: 1-octene, 1-hexene, amylene, 1-octadecene, allyl glycidyl ether, vinylcyclohexene monoxide, allyl (meth)acrylate, and perfluorooctylethylene. Still further examples include terminally unsaturated poly(alkylene oxides) having a terminal group, such as vinyl, allyl, or methallyl, and a chain of repeating ethylene oxide and/or propylene oxide units.

The reactive poly(alkylene oxide) reactants correspond to the formula $R^1(OCH_2CH_2)_v(OCH_2CH(CH_3))_w$—$OR^2$, it being understood that the polyoxyalkylene moiety can be a block or random copolymer of ethoxy and propoxy units and is typically a blend of molecules of varying chain lengths and compositions. In the foregoing formula, $R^1$ denotes an alkenyl group containing from 2 to 10 carbon atoms and is preferably a vinyl, allyl, or methallyl group, and $R^2$ denotes primarily hydrogen or $R^2$ can be an alkyl group containing from 1 to 5 carbon atoms, an acyl group containing 2 to 5 carbon atoms, a vinyl group, an allyl group, a methallyl group, or a trialkylsilyl group. The subscript v has a value of from 0 to about 50 and the subscript w also has a value of from 0 to about 50, provided that the sum of v+w is greater than 0.

Structures of the olefinically unsaturated polyether reactant used can typically range from polyalkyleneoxide mono allyl ether of a nominal molecular weight of 204 Daltons, all ethyleneoxide, to a nominal molecular weight of 4000 Daltons and higher, 40% ethylene oxide and 60% propylene oxide, or to a nominal molecular weight of 1500 Daltons, all propylene oxide. Whether the polyether is capped (e.g., a methyl, allyl ether) or uncapped (a mono allyl ether) is immaterial.

It is preferred that an appropriate buffering agent be present, especially if the polyether is uncapped, such as any of those disclosed in U.S. Pat. No. 4,847,398, the disclosure of which is hereby incorporated herein by reference.

One or more additional olefins or olefinic compounds can also be added as reactants. If used, they can be of any standard structure. For example, ethylene is sometimes used with an allyl-polyether to improve compatibility as a polyurethane foam surfactant; vinylcyclohexenemonoxide is used as a co-reactant with allyl-polyether to form a terpolymer used in textile softening; and eugenol and a polyether are used with a hydrogen siloxane fluid to produce a common diesel fuel anti-foam copolymer. A branched chain olefin, alone, may be used with a hydrogen siloxane fluid to produce a polyurethane foam surfactant (see U.S. Pat. No. 5,001,248).

The reactants are preferably purified, as is known in this field

No compatibilizing agent or "solvent", is needed, but low levels can be added without compromising the effectiveness of the process. However, if this is done, a solvent stripping system may need to be incorporated or the solvent would remain in the copolymer product, as taught in U.S. Pat. Nos. 4,857,583 and 5,153,293.

As indicated above, the hydrosilation reaction is preferably conducted in the presence of a hydrosilation catalyst. Thus, the hydrosilation reaction between the hydrogen siloxane and the olefinically unsaturated polyoxyalkylene or unsaturated olefin reactant is facilitated by using catalytic amounts of a noble metal-containing catalyst. Such catalysts are well known and include platinum, palladium, and rhodium-containing compounds. They are reviewed in the compendium, *Comprehensive Handbook on Hydrosilylation*, edited by B. Marciniec and published by Pergamon Press, NY 1992. In general, platinum catalysts are preferred, and chloroplatinic acid and the platinum complexes of 1,3-divinyltetramethyldisiloxane are particularly preferred.

The catalyst is employed in an amount effective to initiate, sustain, and complete the hydrosilation reaction. The amount of catalyst is usually within the range of from about 1 to about 100 parts per million (ppm) of noble metal, based on the total parts of the mixture of reactants and solvent, if employed. Catalyst concentrations of 3–50 ppm are preferred.

The hydrosilation reaction can be optionally conducted in the presence of additives (or "buffering" agents), such as the carboxylic acid salts disclosed in U.S. Pat. No. 4,847,398 or U.S. Pat. No. 5,986,122 or antioxidants as disclosed in U.S. Pat. No. 5,986,122. In U.S. Pat. No. 4,847,398, the use of "buffering" salts is disclosed, which salts have the effect of preventing the dehydrocondensation of hydroxyl groups with the SiH moiety. This technology is effective for preventing unwanted side reactions during the hydrosilation of uncapped polyethers, e.g., allylpolyethylene oxide glycol. The use of such "buffering" agents in the present invention will provide the same results as in the batch process. In this case, however, the salt must be pre-dissolved in the polyether prior to introduction into the multi-stage blade-mixed plug flow reactor. The concentration used, the salt or other buffer selected, and the effects expected are in all respects comparable to a batch process. The steady-state concentration used in the multi-stage blade-mixed plug flow reactor should be equivalent to that used in a batch process.

The hydrosilation reaction can optionally be carried out in the presence of sterically hindered nitrogen compounds, such as those disclosed in U.S. Pat. No. 5,191,103, or phosphate salts, such as those disclosed in U.S. Pat. No. 5,159,096. Depending on the method of manufacture and the nature of the reactants, one or more of these additives may be present during the hydrosilation reaction. For example, a low, but sometimes adequate, level of carboxylic acid salts or phosphate salts may already be present in olefinically substituted polyoxyalkylenes owing to inadvertent exposure to traces of oxygen during subsequent capping of hydroxyl groups with allylic, methallylic, methyl, or acyl groups, or to neutralization of basic catalysts with phosphoric acid. In such instances, the intentional addition of the salt or other additive may not be necessary.

Equipment

As used herein, the term "turbulent flow" is defined as the flow of liquid across the multi-stage blade tips that creates eddies and vortices of sufficient intensity that a biphasic liquid mixture, such as the siloxane and the polyether (or polyether/olefin mixture) described herein, undergoes shearing of the droplets sufficient to disperse one phase into the other, such that they do not readily separate into two distinct phases more rapidly than two to three half-lives of the chemical reaction (hydrosilation). Thus, intimate contact of the two phases (siloxane and polyether) in the multi-stage blade-mixed portion of the tubular plug flow reactor is assured for a time period sufficiently long to permit the reaction to proceed to 75–90% completion before entering into the unmixed plug portion of the reactor. Whether a multi-stage mixing chamber is appropriate will depend on several factors:

1) the rate of flow of the liquid mixture (volume to flow ratio);

2) the relative miscibility of the siloxane/polyether (or polyether/olefin mixture) components; and 3) the intensity of droplet shear imparted by the multi-stage blade impeller design and configuration.

For example, a high rate of flow using a design comprising a greater number of mixing chambers followed by an unmixed plug-flow maintaining device may suffice, whereas a low flow with low agitator blade speed (low rpm) and plug flow maintaining device would not sufficiently break down droplet size to allow sufficient reaction to prevent phase separation. Likewise, the same "mixing chamber" design, repeated multiple times, may cause sufficient homogenization to effect phase compatibilization, whereas a single mixing chamber may result in incomplete reaction.

No general formula can be given to predict which multi-stage blade-mixer element design will be most effective, or what length reactor or number of mixing chambers or flow rate must be used. Some general guidelines follow siloxanes containing lesser amounts of active hydrogen, to be hydrosilated with more polar polyethers, require greater individual chamber turbulence, i.e., a high number of chambers, a longer length of tubular column, and the best available multi-stage blade mixing efficacy. Polyethers that are least compatible with siloxanes are low molecular weight, or uncapped, or have higher composition as ethylene oxide, or any two or three of these factors. Siloxane/polyether mixtures that are least compatible will require the greatest length, or a higher number of chambers, or the most intense mixing (higher blade rpm) within the individual chambers, or any two or three of these factors in combination. In general, olefinic reactants (other than the polyether) that tend to compatibilize siloxane/polyether mixtures will diminish the need for greater length, higher flow rate, or more mixing chambers.

As employed herein, the term "turbulence" means a greater degree of shear caused by eddies and vortices, as opposed to a lesser, more quiescent, mixing The term "turbulent" means incorporating the properties of turbulence.

The present invention is carried out using at least one (optionally, two or more in series within the same tubular reactor) multi-stage blade-mixed plug flow chambers of sufficient length, diameter, and internal agitation characteristics to afford appropriate residence time. This can be of any design that is known to produce turbulence. Each is equipped with an inlet for the reactants, an outlet for the product stream, and means for vigorously agitating the contents of the plug flow reactor within each individual blade mixed chamber. The outlet of the last multi-stage blade-mixed plug flow chamber is optionally followed in the tubular reactor design by an unmixed tubular plug flow reactor This may optionally be connected to the inlet of a product stripper to remove reaction solvent, if employed. (See FIG. 1)

The residence time within the multi-stage blade-mixed plug flow reactor will depend somewhat on the identity of the particular reactants and on the desired rate of throughput. For some reactions, formation of the desired silicone copolymer proceeds at a rate such that short residence times are sufficient In other reactions, longer reaction times may be needed. This can be controlled by the velocity or rate at which the raw materials are introduced into the unit or by the design length of the chamber and number of the multi-stage mixing elements.

Operation

At steady state, the reactants are continuously fed to the inlet of the multi-stage blade-mixed plug flow reactor. Catalyst can also be fed continuously initially or, optionally, intermittently, along the length of the multi-stage blade mixed plug flow reaction. Preferably, the total amount of the reactive polyether or polyether+olefin fed to the process represents a stoichiometric excess based on the total amount of hydrogen siloxane fed, as it is imperative that the final silicone copolymer product contain no more than a trace amount, i.e., less than 0.1 wt. %, of unreacted hydrogen siloxane, and, preferably, no unreacted hydrogen siloxane at all.

A significant condition, adherence to which has been found to be essential to the effectiveness of the process of the present invention, is that the reaction must proceed in the multi-stage blade-mixed plug flow reactors to such an extent that the stream exiting the final mixed chamber before entering the non-agitated portion of the tubular plug flow portion is homogeneous. Surprisingly, it has been found that this degree of homogeneity can be achieved in a multi-stage blade-mixed plug flow reactor despite the notoriously incompatible natures of the hydrogen siloxane and the reactive polyether reactants It has also been found, all the more surprisingly, that the crude product stream does, indeed, gain its homogeneity while traversing through the multi-stage mixing chamber plug flow reactor without suffering the phase separation that one might expect to occur The point at which the crude product reaches homogeneity typically corresponds to about 80–90% conversion of the hydrogen siloxane to silicone copolymer. This point is sometimes referred to as the "clear point".

To help assure that the crude product stream has passed the clear point, it is preferred to carry out the reaction in the multi-stage blade-mixed and plug flow reactor under conditions of sufficient temperature, residence time, and catalyst loading such that the stream that exits the unit is homogeneous and completely reacted.

Equally important in its effect on catalyst deactivation is the flow rate of reactants into and out of the continuous system. Since catalyst deactivation proceeds rapidly towards the end of the hydrosilation reaction, it is important that the completion of the reaction occur prior to entry into, or within, the non-agitated portion of the plug flow system.

Thus, in one embodiment of the invention, an allylpolyether or an olefin, or both, a platinum catalyst solution, and a hydrogen siloxane fluid are metered into a multi-stage blade-mixed plug flow reactor, and the temperature of the contents is raised to and maintained at between 45° C. and 135° C. while the crude product stream is traversing the length of the unit. The level of catalyst is added at a rate sufficient initially to take the entire contents to the desired concentration of noble metal, and afterwards sufficient to maintain that concentration. After catalyst addition, an exotherm is observed in the multi-stage mixer. Once the plug-flow reactor is full, flow can, optionally, begin to a conventional stripping unit to remove trace volatiles to reduce odor or flammability, or the product can be collected and further processed, as, for example, by filtration or stripping elsewhere, if desired. The copolymer exiting the plug flow reactor does not require any further reaction to be suitable for use as surface active agent.

The volume (size) and number of the multi-stage blade-mixed chambers can be adjusted depending upon the specific needs of the product being made, and is intended to obtain phase compatibilization by vigorous turbulence in each chamber. The need for additional mixing chambers or greater agitator blade rpm will become apparent if a sample of the reaction mixture exiting the last chamber shows evidence of phase separation, e.g., the development of two, distinct phases, or if, upon centrifugation to remove air bubbles, the sample remains hazy, which is evidence of incomplete reaction.

In a preferred embodiment of the system, the hydrosilation reaction is carried out continuously in a tubular reactor having a cylindrical shape (See FIG. 1), equipped with multiple mixing chambers 4 with "stationary circular separating barriers" 6 between each mixing bladed chamber 4 and following the final mixing bladed chamber. The stationary separating barrier of circular cross section possesses at least one perforation or hole 7 in order to maintain a through flow within the reactor. It is therefore possible, simultaneously with the stirring action provided by high shear impellers 5 in the chambers of the design, to ensure high plug-flow characteristic properties across the length of the tubular reactor This permits adequate hydrosilation reaction time and, if an average residence time is chosen that slightly exceeds the time required for completion of the reaction, it becomes possible to obtain the desired reaction conversion.

Typical stationary separating barrier configurations are shown in FIG. 1 item 6. If the separating barriers are too small or contain too many perforations, there is a risk of losing plug-flow properties in the reactor. Therefore, the cross-sectional area of the stationary separating barriers should be maximized, preferably at greater than 90% of the cross-sectional area of the tubular reactor The number of stationary separating barriers should be at least equal to the number of separate agitator blades. A set of one agitator blade and one stationary separating barrier constitutes a single mixing stage or chamber The greater the number of mixing stages, the better the plug-flow simulating conditions. It is expected that at least six, preferably ten or more, mixing stages or chambers will be used. The reactor may have a vertical or horizontal configuration; vertical is preferred.

The copolymer produced by the above described process appears to be different from that prepared as described in U.S. Pat. No. 5,986,022. One manner in which this uniqueness appears is in the performance of the copolymer in the production of polyurethane foam. The silicone copolymers of the present invention can be used in such production in the same manner as known silicone copolymer surfactants prepared by batch processing, without adjusting reactant stoichiometry. Thus, a foamable mixture is formed comprising a polyol component, a polyisocyanate prepolymer, a catalyst, an optional auxiliary blowing agent, and the silicone copolymer surfactant and reacted to produce the polyurethane foam.

In contrast to copolymers produced in accordance with U.S. Pat. No. 5,986,022, the copolymers produced according to the present invention afford stabilized flexible polyurethane foam (non-collapsed) that is of finer celled structure (lower rating) and more potent (higher foam rise) in nature, similar or identical to batch-produced copolymer surfactants. It is well known in the art that the molecular weight of the polyether side-chain strongly influences both potency and foam cell structure quality: higher molecular weight produces more potent surfactant, i.e., less is needed to cause an equivalent degree of foaming of the polyurethane reacting mixture, but a tighter (fewer open cells) and coarser cell structure.

Thus, by producing the copolymer in continuous fashion in accordance with the present invention, the manner of combination of the hydrogen siloxane fluid with the allylpolyether appears to have been unexpectedly altered as compared to prior continuous processes, consistent with the observed change in its ability to stabilize polyurethane foam and in the finer cell structure of the foam.

In the present invention, it is important that the residence time (volume-to-flow ratio) in each of the mix stage chambers be optimized in duration to maintain a plug flow nature across the length of the entire unit In the continuous stirred tank reactor mode taught in U.S. Pat. No. 5,986,022, the tanks are much larger and, thus, average residence times are much greater per stirred tank; hence, the SiH molecules react only in part at any one time and the flow through this type of design is not a consistent plug flow design. These volume-to-flow differences are consistent with the hypothesis that the reaction has taken a different chemical course, proven by the large differences in cell structure quality and foam potency observed in polyurethane foams made with the copolymer surfactants of the present invention.

Thus, the multi-stage mixer process provides a distribution of polyether molecules along the silicone backbone that is similar to those obtained by the batch-wise process, i.e., product performance attributes are similar or identical to batch-prepared products.

Whereas the scope of the present invention is set forth in the appended claims, the following specific examples illustrate certain aspects of the present invention and, more particularly, point out methods of evaluating the same It is to be understood, therefore, that the examples are set forth for illustration only and are not to be construed as limitations on the present invention. All parts and percentages are by weight unless otherwise specified.

EXAMPLES

The following test procedures were used to evaluate the products obtained in the examples.

Foam Test

Unless otherwise indicated in the Examples, the polyurethane foams were prepared according to the general procedure described in *Urethane Chemistry and Applications*, K. N. Edwards, Ed., American Chemical Society Symposium Series No., 172, A.C.S., Washington, D.C. (1981), pg 130 and *J. Cellular Plastics, November/December* 1981 pgs. 333–334. The basic steps in the procedures for mixing and foaming of blown polyurethane foam on a laboratory scale are:

1. The formulation ingredients are weighed and made ready to be added in the predetermined sequence to the mixing container.

2. The formulation ingredients (with the exception of polyisocyanate) are mixed intensively, and allowed to "degas" for a prescribed time An auxiliary blowing agent, other than water, may be added (if such auxiliary agent is used) prior to mixing.

3. Polyisocyanate is added and the formulation is mixed again. The mixed formulation is poured quickly into an open-topped container, such as an open-topped disposable plastic pail for slab foam, and the foam is allowed to rise 4. After the rise is complete, the foam is allowed to stand for a total of 3 minutes from the time the mixing procedure began and is then post-cured in an oven at 115° C. for fifteen minutes.

Foam Cell uniformity (Table 1, Cell Structure rating between 4 and 12) is judged by the structure of the foam, where a "4" rating (the best) has a small uniform cell structure and a "12" rating (the worst) has a large non-uniform coarse cell structure Foams are evaluated in duplicate and the values averaged Urethane foam Air Flow (Table 1, AF) is obtained utilizing a NOPCO instrument on a horizontal ½ inch (1.27 cm) thick cut of foam obtained three inches from the bottom of the foam bun The Porosity of the foam is measured in liters/sec of air flow through the ½ inch (1.27 cm) thick cut of foam.

Viscosity

Viscosity is determined at 25° C., using a calibrated Ostwald viscometer that gives an efflux time of approximately 100 seconds. The measurements are repeated until the efflux time readings agree within 0.1 second. Calculations are determined by the equation:

$$E \times F = \text{Viscosity (cstk)},$$

where E is the efflux time in seconds and F is a calibration factor.

Multi-stage Blade-mixed Plug Flow Reactor Apparatus

The multi-stage blade-mixed plug flow reactor comprises a tubular reactor as depicted in FIG. 1. The tubular reactor was 600 mm in length with an inside diameter of 50 mm. The tubular reactor as illustrated, comprised eight agitated reaction stages 4 that were 20 mm in length with an average residence time for reaction of 4 to 8 minutes (see examples). Each of the eight stages was agitated with a high shear radial flow impeller 5 that was 44 mm in diameter and rotating at 300 rpm. Each stationary separating barrier 6 possessed a 50 mm diameter and was 7 mm at its thickest with a centered 9 mm circular perforation to accommodate an 8 mm rotating center shaft 8. Each stationary separating barrier 6 also possessed a 7 mm circular perforation 7 to accommodate reactant flow and was sized to maintain an adequate plug flow of reactants as smooth as possible across the length of the blade mixed chambers and non-agitated plug flow portion 10. The tubular reactor was jacketed with a recirculating hot oil system 11 having an outlet 13 to maintain reaction temperature. The equilibrated methyl hydrogen polysiloxane fluid was continuously fed by means of a pump 1 from a reservoir via a Teflon line having a one-way check valve into the base of the first chamber 4 of the multi-stage blade-mixed plug flow reactor. The olefin component was continuously fed with a pump 2 into the first chamber 4 of the multi-stage blade-mixed plug flow reactor via PFA tubing having a one-way check valve. The chloroplatinic acid catalyst (3.3% solution in ethanol) was continuously fed with a pump 3 into the first chamber 4 of the multi-stage blade-mixed plug flow reactor via PFA tubing having a one-way check valve. The final product was continuously collected in a product receiver 12 after sequentially passing through all eight blade-mixed chambers and the un-agitated portion of the plug flow tubular reactor.

In this experimental set-up, the reaction temperature is controlled by a temperature controlled hot oil system providing recirculating oil through the jacket of the tubular reactor. The stoichiometry and the residence time are controlled by the flow rate output of the feed pumps for all the components, i.e., the equilibrated methyl hydrogen polysiloxane, the olefin, and the platinum catalyst solution The pumps continuously fed the reactants into the tubular reactor The stream of partially miscible liquids was mixed in each of the eight separated mixing stages by high shear radial flow impellers connected to a rotating center shaft driven by a motor 9.

Examples 1–4 are comparative examples in which the method of preparation utilizes a batch hydrosilation process.

Examples 5–8 are comparative examples that demonstrate the production of copolymers employing a continuous hydrosilation process utilizing two continuous stirred reactors (CSTR) followed by a non-agitated plug flow reactor in series as taught in U.S. Pat. No. 5,986,022.

Examples 9–12 demonstrate the production of copolymers according to the present invention, employing a continuous hydrosilation process utilizing a tubular multi-stage blade-mixed plug flow reactor.

Example 1 (batch), Example 5 (CSTR), and Example 9 (multi-stage blade-mixed tubular reactor) utilized the same raw materials in the same stoichiometric ratios. The olefinically substituted polyether was a methyl terminated polyether comprising polyethyleneoxide-polypropyleneoxide and pretreated with ascorbic acid as taught in U.S. Pat. No. 5,986,122. This copolymer product is used in flexible polyurethane foam applications.

Example 2 (batch), Example 6 (CSTR), and Example 10 (multi-stage blade-mixed tubular reactor) utilized the same raw materials in the same stoichiometric ratios. The olefinically substituted polyether was an acetoxy-terminated polyether comprising polyethyleneoxide-polypropyleneoxide. This copolymer product is used in flexible polyurethane foam applications.

Example 3 (batch), Example7 (CSTR), and Example 11 (multi-stage blade-mixed tubular reactor) utilized the same raw materials in the same stoichiometric ratios. The olefinically substituted polyethers were a mixture of acetoxy-terminated polyethers comprising polyethyleneoxide-polypropyleneoxide and polyethyleneoxide This copolymer product is used in flexible polyurethane foam applications Example 4 (batch), Example 8 (CSTR), and Example 12 (multi-stage blade-mixed tubular reactor) utilized the same raw materials in the same stoichiometric ratios The olefinically substituted polyethers were a mixture of acetoxy-terminated polyethers comprising polyethyleneoxide-polypropyleneoxide and polyethyleneoxide This copolymer product is used in flexible polyurethane foam applications.

List of Materials and Abbreviations

M $(CH_3)_3SiO_{1/2}$,

D=$(CH_3)_2SiO$,

D'=$(CH_3)(H)SiO$

40HA1500-OAc=acetoxy capped allyl started random polyether with nominally 40 wt % ethylene oxide (EO)/60 wt % propylene oxide (PO)—1500 Daltons number average molecular weight (mw)

40HA4000-OAc=acetoxy capped allyl started random polyether with nominally 40 wt % ethylene oxide (EO)/60 wt % propylene oxide (PO)—4000 Daltons number average molecular weight (mw)

40HA550-OAc=acetoxy-terminated allyl started random polyether with nominally 40 wt % ethylene oxide (EO)/60 wt % propylene oxide (PO)—550 Daltons number average molecular weight (mw)

40HA4000-OMe=methyl-terminated allyl started random polyether with nominally 40 wt % ethylene oxide (EO)/60 wt % propylene oxide (PO)—4000 Daltons number average molecular weight (mw)

40HA1500-OMe=methyl-terminated allyl started random polyether with nominally 40 wt % ethylene oxide (EO)/60 wt % propylene oxide (PO)—1500 Daltons number average molecular weight (mw)

100HA550-OAc=acetoxy-terminated allyl started polyether with 100 wt % ethylene oxide (EO)—550 Daltons number average molecular weight (mw)

Example 1

Batch Comparative

To a 4-necked, 500 mL round bottom flask, equipped with a stirrer, Friedrich condenser, a temperature-controller, and a sparge tube, the following materials were charged: 221.5 grams of a 40HA1500-OMe and 40HA4000-OMe polyether blend, 0.09 gram of tributylamine, and 77.3 grams of equilibrated methyl hydrogen polysiloxane fluid having a nominal structure of $MD_{70}D'_5M$. The flask contents were agitated and heated to 86° C. reaction temperature with a slight nitrogen purge. At the 86° C. temperature, heating was stopped and the reaction was catalyzed with 0.29 mL of 3.3% chloroplatinic acid solution in ethanol (10 ppm Pt). Within 10 minutes, the reaction mixture turned clear The reaction pot was agitated at 85° C. for an additional 30 minutes. The reaction product was cooled to room temperature to afford a clear haze-free product of 2349 cstk viscosity. No residual silanic hydrogen was detected in the product.

Example 2

Batch Comparative

To a 4-necked, 500 mL round bottom flask, equipped with a stirrer, Friedrich condenser, a temperature-controller and a sparge tube, the following materials were charged: 178.9 grams of a 40HA4000-OAc and 40HA550-OAc polyether blend, 0.09 gram of tributylamine, and 51.1 grams of equilibrated methyl hydrogen polysiloxane fluid having a nominal structure of $MD_{65}D'_7M$. The flask contents were agitated and heated to 95° C. reaction temperature with a slight nitrogen purge. At the 95° C. temperature, heating was stopped and the reaction was catalyzed with 0.22 mL of 3.3% chloroplatinic acid solution in ethanol (10 ppm Pt). Within 2 minutes the reaction exothermed and the flask temperature peaked at 109° C. The reaction pot was cooled to 95° C. and agitated an additional 30 minutes. This reaction product was cooled to room temperature to afford a clear product of 2771 cstk. No residual silanic hydrogen was detected in the product.

Example 3

Batch Comparative

To a 4-necked, 500 mL round bottom flask, equipped with a stirrer, Friedrich condenser, a temperature-controller and a sparge tube, the following materials were charged: 140.0 grams of a 40HA4000-OAc, 40HA1500-OAc and 100HA550-OAc polyether blend, 0.07 gram of tributylamine, 46.0 grams of dipropyleneglycol, and 44.0 grams of equilibrated methyl hydrogen polysiloxane fluid having a nominal structure of $MD_{65}D'_7M$. The flask contents were agitated and heated to 90° C. reaction temperature with a slight nitrogen purge. At the 90° C. temperature, heating was stopped and the reaction was catalyzed with 0.22 mL of 3.3% chloroplatinic acid solution in ethanol (10 ppm Pt) Within 7 minutes the reaction exothermed and the flask temperature peaked at 98° C. The reaction pot was cooled to 90° C. and agitated an additional 10 minutes This reaction product was cooled to room temperature to afford a clear haze-free product of 1003 cstk. No residual silanic hydrogen was detected in the product.

Example 4

Batch Comparative

To a 4-necked, 500 mL round bottom flask, equipped with a stirrer, Friedrich condenser, a temperature-controller and a sparge tube, the following materials were charged: 161.7 grams of a 40HA4000-OAc and 100HA550-OAc polyether blend, 0.07 gram of tributylamine, and 68.3 grams of equilibrated methyl hydrogen polysiloxane fluid having a nominal structure of $MD_{65}D'_7M$. The flask contents were agitated and heated to 90° C. reaction temperature with a slight nitrogen purge. At the 90° C. temperature, heating was stopped and the reaction was catalyzed with 0.22 mL of 3.3% chloroplatinic acid solution in ethanol (10 ppm Pt). Within 2 minutes the reaction exothermed and the flask temperature peaked at 111° C. The reaction pot was cooled to 90° C. and agitated an additional 15 minutes. This reaction product was cooled to room temperature to afford a clear haze-free product of 1794 cstk. No residual silanic hydrogen was detected in the product

Example 5

CSTR Comparative

In steady state operation, 260.5 grams/hour of a 40HA1500-OMe and 40HA4000-OMe polyether blend (same lot as used in Examples 1 and 9) containing 0.04 weight percent tributylamine was fed into a first continuous stirred tank reactor (CSTR) apparatus and 89.5 grams/hour of equilibrated methyl hydrogen polysiloxane fluid having a nominal structure of $MD_{70}D'_5M$ (same lot as used in Examples 1 and 9) was fed into the first continuous stirred reactor apparatus as described in U.S. Pat. No. 5,986,022. The temperature of the 40HA1500-OMe and 40HA4000-OMe polyethers and methyl hydrogen polysiloxane mixture held in the first CSTR was 85–95° C. The agitated reaction in the first CSTR was catalyzed continuously with a 3.3% chloroplatinic acid solution in ethanol at a rate of 0.34 mL/hour that afforded a constant concentration of 10 ppm of platinum in the first CSTR. The reaction mixture was pumped out of the first CSTR at the same rate at which it entered the first CSTR (350.0 grams/hour) through an insulated pipeline and into a second CSTR. The temperature in the second CSTR was maintained at 85–95° C. The reaction mixture left the second stirred reactor with a temperature of 85–95° C. as a hazy liquid at a rate of 350.0 grams/hour and entered the plug flow reactor. The heating of the plug flow reactor was controlled so that the reaction mixture maintained a temperature of at least 85° C. The average residence time in the combined volume of the three reactors was 3.0 hours The resulting product was cooled to <50° C. to afford a hazy product of 2461 cstk Residual silanic hydrogen was detected at a level of 0.4 ccH$_2$/gram of product. This reaction did not go to full completion.

Example 6

CSTR Comparative

In steady state operation, 272.3 grams/hour of a 40HA4000-OAc and 40HA550-OAc polyether blend (same lot of materials as used in Examples 2 and 10) containing 0.04 weight percent tributylamine was fed into a first continuous stirred tank reactor (CSTR) apparatus and 77.7 grams/hour of equilibrated methyl hydrogen polysiloxane fluid having a nominal structure of $MD_{65}D'_7M$ (same lot as used in Examples 2 and 10) was fed into the first continuous stirred reactor apparatus as described in U.S. Pat. No. 5,986,022. The temperature of the 40HA4000-OAc and 40HA550-OAc polyethers and methyl hydrogen polysiloxane mixture held in the first CSTR was 85–95° C. The agitated reaction in the first CSTR was catalyzed continuously with a 3.3% chloroplatinic acid solution in ethanol at a rate of 0.34 mL/hour that afforded a constant concentration of 10 ppm of platinum in the first CSTR. The reaction mixture was pumped out of the first CSTR at the same rate at which it entered the first CSTR (350.0 grams/hour) through an insulated pipeline and into a second CSTR. The temperature in the second CSTR was maintained at 85–95° C. The reaction mixture left the second stirred reactor with a temperature of 85–95° C. as a hazy liquid at a rate of 350.0 grams/hour and entered the plug flow reactor. The heating of the plug flow reactor was controlled so that the reaction mixture maintained a temperature of at least 85° C. The average residence time in the combined volume of the three reactors was 3.0 hours. The resulting product was cooled to <50° C. to afford a hazy product of 2569 cstk. Residual silanic hydrogen was detected at a level of 0.1 $ccH_2$/gram of product

Example 7

CSTR Comparative

In a steady state operation, 283.1 grams/hour of a 40HA4000-OAc, 40HA1500-OAc, 100HA550-OAc and dipropyleneglycol blend (same lots of materials as used in Examples 3 and 11) containing 0.03 weight percent tributylamine was fed into a first continuous stirred tank reactor (CSTR) apparatus and 67.0 grams/hour of equilibrated methyl hydrogen polysiloxane fluid having a nominal structure of $MD65D'_7M$ (same lot as used in Example 3 and 11) was fed into the first continuous stirred reactor apparatus as described in U.S. Pat. No. 5,986,022. The temperature of the 40HA4000-OAc, 40HA1500-OAc, 100HA550-OAc polyethers, dipropyleneglycol, and methyl hydrogen polysiloxane mixture held in the first CSTR was 85–95° C. The agitated reaction in the first CSTR was catalyzed continuously with a 3.3% chloroplatinic acid solution in ethanol at a rate of 0.34 mL/hour that afforded a constant concentration of 10 ppm of platinum in the first CSTR. The reaction mixture was pumped out of the first CSTR at the same rate at which it entered the first CSTR (350.1 grams/hour) through an insulated pipeline and into a second CSTR. The temperature in the second CSTR was maintained at 85–95° C. The reaction mixture left the second stirred reactor with a temperature of 85–95° C. as a slightly hazy liquid at a rate of 350.1 grams/hour and entered the plug flow reactor. The heating of the plug flow reactor was controlled so that the reaction mixture maintained a temperature of at least 85° C. The average residence time in the combined volume of the three reactors was 3.0 hours. The resulting product was cooled to <50° C. to afford a clear product of 942 cstk. No residual silanic hydrogen was detected in the product.

Example 8

CSTR Comparative

In a steady state operation, 246.7 grams/hour of a 40HA4000-OAc and 100HA550-OAc polyether blend (same lots of materials used in Examples 4 and 12) containing 0.03 weight percent tributylamine was fed into a first continuous stirred tank reactor (CSTR) apparatus and 104.0 grams/hour of equilibrated methyl hydrogen polysiloxane fluid having a nominal structure of $MD_{65}D'_7M$ (same lot as used in Examples 4 and 12) was fed into the first continuous stirred reactor apparatus as described in U.S. Pat. No. 5,986,022. The temperature of the 40HA4000-OAc, 100HA550-OAc polyethers, and methyl hydrogen polysiloxane mixture held in the first CSTR was 85–95° C. The agitated reaction in the first CSTR was catalyzed continuously with a 3.3% chloroplatinic acid solution in ethanol at a rate of 0.34 mL/hour that afforded a constant concentration of 10 ppm of platinum in the first CSTR. The reaction mixture was pumped out of the first CSTR at the same rate at which it entered the first CSTR (350.7 grams/hour) through an insulated pipeline and into a second CSTR. The temperature in the second CSTR was maintained at 85–95° C. The reaction mixture left the second stirred reactor with a temperature of 85–95° C. as a clear liquid at a rate of 350.7 grams/hour and entered the plug flow reactor. The heating of the plug flow reactor was controlled so that the reaction mixture maintained a temperature of at least 85° C. The average residence time in the combined volume of the three reactors was 3.0 hours. The resulting product was cooled to <50° C. to afford a clear product of 1851 cstk. No residual silanic hydrogen was detected in the product.

Example 9

In steady state operation, 221.3 grams/hour of a 40HA1500-OMe and 40HA4000-OMe polyether blend (same lots of materials as used in Examples 1 and 5), containing 0.04 weight percent tributylamine, and 77.2 grams/hour of equilibrated methyl hydrogen polysiloxane fluid having a nominal structure of $MD_{70}D'_5M$ (same lot of material as used in Examples 1 and 5) were continuously fed into a multi-stage blade-mixed plug flow reactor apparatus as depicted in FIG. 1. The multi-stage blade-mixed reaction was catalyzed continuously with a 3.3% chloroplatinic acid solution in ethanol fed in together with the 40HA1500-OMe and 40HA4000-OMe polyether blend to afford a constant concentration of 10 ppm of platinum. The multi-stage blade-mixed plug flow reactor was maintained at a constant temperature range of 85–95° C. The product was continuously withdrawn from the multi-stage blade-mixed plug flow reactor as a homogeneous clear liquid at a rate of 298.5 grams/hour. The average residence the in the multi-stage blade-mixed plug flow reactor was 4.0 hours. The resulting product was cooled to <50° C. to afford a clear haze-free product of 2482 cstk. No residual silanic hydrogen was detected in the product

Example 10

In a steady state operation, 311.2 grams/hour of a 40HA4000-OAc and 40HA550-OAc polyether blend (same lot of materials as used in Examples 2 and 6), containing 0.03 weight percent tributylamine, and 88.8 grams/hour of equilibrated methyl hydrogen polysiloxane fluid having a nominal structure of $MD_{65}D'_7M$ (same lot of material as used in Examples 2 and 6) were continuously fed into a multi-stage blade-mixed plug flow reactor apparatus as depicted in FIG. 1. The multi-stage blade-mixed reaction was catalyzed continuously with a 3.3% chloroplatinic acid solution in ethanol fed in together with the 40HA4000-OAc and 40HA550-OAc polyether blend to afford a constant concentration of 10 ppm of platinum. The multi-stage blade-mixed plug flow reactor was maintained at a constant temperature range of 85–95° C. The product was continuously withdrawn from the multi-stage blade-mixed plug flow reactor as a homogeneous clear liquid at a rate of 400.0 grams/hour. The average residence time in the multi-stage blade-mixed plug flow reactor was 3.0 hours. The resulting product was cooled to <50° C. to afford a clear haze-free product of 2626 cstk. No residual silanic hydrogen was detected in the product.

Example 11

In steady state operation, 323.5 grams/hour of a 40HA4000-OAc, 40HA1500-OAc, 100HA550-OAc, and dipropylenglycol blend (same lot of material as used in Examples 3 and 7), containing 0.03 weight percent tributylamine, and 76.5 grams/hour of equilibrated methyl hydrogen polysiloxane fluid having a nominal structure of $MD_{65}D'_7M$ (same lot of material as used in Examples 3 and 7) were continuously fed into a multi-stage blade-mixed plug flow reactor apparatus as depicted in FIG. 1. The multi-stage blade-mixed reaction was catalyzed continuously with a 3.3% chloroplatinic acid solution in ethanol fed in together with the 40HA4000-OAc, 40HA1500-OAc, 100HA550-OAc, and DPG blend to afford a constant concentration of 10 ppm of platinum The multi-stage blade-mixed plug flow reactor was maintained at a constant temperature range of 85–95° C. The product was continuously withdrawn from the multi-stage blade-mixed plug flow reactor as a homogeneous clear liquid at a rate of 400.0 grams/hour. The average residence time in the multi-stage blade-mixed plug flow reactor was 3.0 hours. The resulting product was cooled to <50° C. to afford a clear haze-free product of 1036 cstk. No residual silanic hydrogen was detected in the product.

Example 12

In steady state operation, 281.2 grams/hour of a 40HA4000-OAc and 100HA550-OAc polyether blend (same lot of materials as used in Examples 4 and 8), containing 0.03 weight percent tributylamine, and 118.8 grams/hour of equilibrated methyl hydrogen polysiloxane fluid having a nominal structure of $MD_{65}D'_7M$ (same lot of material as used in Examples 4 and 8) were continuously fed into a multi-stage blade-mixed plug flow reactor apparatus as depicted in FIG. 1. The multi-stage blade-mixed reaction was catalyzed continuously with a 3.3% chloroplatinic acid solution in ethanol fed in together with the 40HA4000-OAc, and 100HA550-OAc polyether blend to afford a constant concentration of 10 ppm of platinum. The multi-stage blade-mixed plug flow reactor was maintained at a constant temperature range of 85–95° C. The product was continuously withdrawn from the multi-stage blade-mixed plug flow reactor as a homogeneous clear liquid at a rate of 400.0 grams/hour. The average residence time in the multi-stage blade-mixed plug flow reactor was 3.0 hours. The resulting product was cooled to <50° C. to afford a clear haze-free product of 1833 cstk. No residual silanic hydrogen was detected in the product.

TABLE I

| Example # | Method of Preparation | Final SiH level cc $H_2$/gram | Appearance | Viscosity (cstk) | Foam Rise (cm) | Foam Air flow (Porosity) | Cell Structure |
| --- | --- | --- | --- | --- | --- | --- | --- |
| 1 | Batch | ND | clear | 2349 | 38.0 | 5.2 | 7 |
| 5 | CSTR-CCU | 0.4 | hazy | 2461 | 36.8 | 4.2 | 10 |
| 9 | MS blade mixer | ND | clear | 2482 | 38.6 | 6.3 | 7 |
| 2 | Batch | ND | clear | 2771 | 40.5 | 2.2 | 6 |
| 6 | CSTR-CCU | 0.1 | hazy | 2569 | Total Foam Collapse | | |
| 10 | MS blade mixer | ND | clear | 2626 | 39.3 | 7.0 | 7 |
| 3 | Batch | ND | clear | 1003 | 37.9 | 6.6 | 7 |
| 7 | CSTR-CCU | ND | clear | 942 | 37.1 | 6.1 | 8 |
| 11 | MS blade mixer | ND | clear | 1036 | 37.9 | 5.6 | 7 |
| 4 | Batch | ND | clear | 1794 | 40.9 | 5.1 | 7 |
| 8 | CSTR-CCU | ND | clear | 1851 | 39.0 | 5.9 | 7 |
| 12 | MS blade mixer | ND | clear | 1833 | 40.7 | 5.1 | 7 |

ND = non-detectable

These data show a more fine-celled uniform foam as prepared by the present invention as seen in the lower values obtained for the foam cell structure rating as compared to other continuous methods of preparation Additionally, these data show higher potency flexible polyurethane foam as seen in the greater foam rise as taught in the present invention versus that taught previously for continuous methods of preparation. The present invention always afforded a clear homogeneous product (appearance is clear) and the reaction has successfully gone to full completion with the absence of residual silanic hydrogen (final SiH level is non-detectable).

In view of the many changes and modifications that can be made without departing from principles underlying the invention, reference should be made to the appended claims for an understanding of the scope of the protection to be afforded the invention.

What is claimed is:

1. A process for producing silicone copolymers, comprising the steps of:
   (a) providing at least one multi-stage blade-mixed plug flow reactor having an entry and an exit;
   (b) continuously feeding (i) hydrogen siloxane, (ii) olefinically substituted polyether or olefin capable of reacting with said hydrogen siloxane, and (iii) catalyst for the reaction to the entry of the multi-stage blade-mixed plug flow reactor; and
   (c) continuously withdrawing from the exit of the multi-stage blade-mixed plug flow reactor a stream that comprises silicone copolymer and is substantially free of unreacted hydrogen sioxane, provided that said hydrogen sioxane and said polyether or olefin have a residence time at reaction temperature in the multi-stage blade-mixed plug flow reactor sufficient to effect substantially complete hydrosilation.

2. The method of claim 1 wherein the hydrogen sioxane is an organohydrogen siloxane comprising any combination of siloxane units selected from the group consisting of $R_3SiO_{1/2}$, $R_2HSiO_{1/2}$, $R_2SiO_{2/2}$, $RHSiO_{2/2}$, $RSiO_{3/2}$, and $HSiO_{3/2}$, wherein each R group is an independently selected hydrocarbon moiety; provided that the hydrogen siloxane comprises sufficient R-containing sioxane units to provide an average of from 1 to 3 R radicals per silicon atom and sufficient H-containing siloxane units to provide from 0.01 to 1 silicon-bonded hydrogen atoms per silicon atom and a total of R radicals and silicon-bonded hydrogen atoms of from 1.5 to 3.0 per silicon atom.

3. The method of claim 2 wherein the hydrocarbon moiety is an alkyl moiety of from 1 to 12 carbon atoms, a cycloaliphatic moiety of from from 5 to 12 carbon atoms, or an aryl moiety, optionally substituted with from 1 to 6 alkyl groups, each of from 1 to 6 carbon atoms.

4. The method of claim 3 wherein all the R groups are the same.

5. The method of claim 4 wherein all the R groups are methyl.

6. The method of claim 1 wherein the olefin reactant is selected from the group consisting of allyl chloride, methallyl chloride, 1-octene, 1-hexene, amylene, 1-octadecene, allyl glycidyl ether, vinylcyclohexene monoxide, allyl (meth)acrylate, perfluorooctylethylene, and terminally unsaturated poly(alkylene oxides).

7. The method of claim 6 wherein the olefin reactant is a terminally unsaturated poly(alkylene oxide) of the formula $R^1(OCH_2CH_2)_v(OCH_2CH(CH_3))_w\text{-}OR^2$, wherein $R^1$ is an alkenyl group containing from 2 to 10 carbon atoms and $R^2$ is selected from the group consisting of hydrogen, alkyl of from 1 to 5 carbon atoms, acyl of from 2 to 5 carbon atoms, vinyl, allyl, methallyl, and trialkylsilyl; v has a value of from 0 to about 50; and w has a value of from 0 to about 50, provided that the sum of v+w is greater than 0.

8. The method of claim 1 wherein the catalyst is a noble metal-containing catalyst.

9. The method of claim 8 wherein the noble metal is selected from the group consisting of platinum, palladium, and rhodium.

10. The method of claim 9 wherein the noble metal is platinum.

11. The method of claim 10 wherein the catalyst is selected from the group consisting of chloroplatinic acid and the platinum complexes of 1,3-divinyltetramethyldisiloxane.

* * * * *